United States Patent [19]
McDonald et al.

[11] 3,818,456

[45] June 18, 1974

[54] MESSAGE METERING SYSTEM

[75] Inventors: John C. McDonald; Dalton W. Martin, both of Los Altos, Calif.

[73] Assignee: Vidar Corporation, Mountain View, Calif.

[22] Filed: Oct. 6, 1972

[21] Appl. No.: 295,656

[52] U.S. Cl. .......... 340/172.5
[51] Int. Cl. .......... H04m 15/00
[58] Field of Search .......... 340/172.5; 179/1 D

[56] References Cited

UNITED STATES PATENTS

| | | | |
|---|---|---|---|
| 3,368,207 | 2/1968 | Beansoleil et al. | 340/172.5 |
| 3,390,379 | 6/1968 | Carlson et al. | 340/172.5 |
| 3,413,612 | 11/1968 | Brooks et al. | 340/172.5 |
| 3,740,722 | 6/1973 | Greenberg et al. | 340/172.5 |

*Primary Examiner*—Paul J. Henon
*Assistant Examiner*—Paul R. Woods
*Attorney, Agent, or Firm*—Flehr, Hohbach, Test, Albritton & Herbert

[57] ABSTRACT

Disclosed is a local message metering system for metering information concerning each subscribers use of a telephone system. Each subscriber is directly connected to the measuring system with a multistate signal which indicates the line usage by a subscriber. The multistate signal for each subscriber is digitally encoded, scanned and interpreted by the metering system and pertinent information is recorded in memory. The metering system has memory automatically recording the calling subscriber's directory number, zone called, call duration and time of termination including one memory location for each subscriber. The message metering system additionally includes self-checking features and a service observing unit for detailed observation of the system use by selected subscribers.

20 Claims, 9 Drawing Figures

PATENTED JUN 18 1974

3,818,456

SHEET 3 OF 7

MESSAGE METERING SYSTEM

BACKGROUND OF THE INVENTION

The present invention relates to the field of telephone systems and particularly to message metering systems for detecting and storing information concerning subscribers' use of the system.

Message metering equipment is necessary for recording information resulting from toll, long distance and other types of telephone service. Such equipment requires the ability to detect and store information to enable usage-sensitive charging of subscribers. Local use by subscribers has been on a nonusage-sensitive basis employing equipment which has not heretofore, been readily adapted to metering. With new types of local telephone usage such as credit-card checking, time-sharing data transmission, and burglary prevention, a need for detecting and storing information concerning the nature of local usage has become important.

While apparatus exists for monitoring the gross accumulated number of events, such as the number of completed calls for a telephone subscriber, such apparatus does not provide sufficient data for detailed billing of subscribers on a usage-sensitive basis.

While modern day electronic technology provides increased capability for reliably processing information signals, the application of that technology to the presently installed local subscriber telephone circuitry for usage-sensitive metering has presented a problem in reliability and economy which has not heretofore been adequately solved.

SUMMARY OF THE INVENTION

The present invention is a method and apparatus for metering subscriber usage in a telephone system. Each local subscriber is connected via an isolated data link to a digital encoder. The digital encoder encodes the multistate subscriber signal to a digital representation which is analyzed by the system and is stored in a memory storage location which corresponds to the individual subscriber. The storage locations are addressed in a sequential manner which corresponds to the sequential addressing of the subscriber lines. Each time a memory location and a corresponding subscriber is addressed, the multistate subscriber signal is sensed, interpreted and stored. Message information is read out from the internal cyclic memory and stored in external stores, such as magnetic tape units.

In accordance with one embodiment of the present invention, each group of 1,000 subscriber line metering signals, from the subscriber switching circuits, is connected as the input to a scanner bank. Each scanner bank functions to periodically poll the input subscriber metering signals, addressed four at a time, and to encode the multilevel subscriber signals to digital representations. Each scanner bank also includes 16 test locations for testing the metering system. Each scanner bank is associated with a scanner bank adapter which functions to address the subscriber lines in the scanner banks and receive their encoded outputs for analysis and to store usage information in storage locations concurrently addressed. Each scanner bank adapter reads out the subscriber usage information from memory using either of two redundant data paths which connect to an output and control unit. The redundant data paths are under common control and serve to buffer and control the transmission of information to the external storage.

The output and control unit is operative to sequentially scan the scanner bank adapters wherein only one scanner bank adapter is connected to either the data path A or to the data path B at any one time. In addition to the scanner bank adapters, the output and control unit also periodically scans a service observing unit which functions to form a detailed observation of line usage by selected subscribers.

In accordance with the above summary, the present invention achieves the objective of providing a message metering system which converts the multistate signal associated with each local subscriber to a digitally encoded value. Each subscriber is periodically polled and analyzed by the metering system in order to record information concerning the local subscriber usage of the telephone system.

Additional objects and features of the invention will appear from the following description in which the preferred embodiments of the invention have been set forth in detail in conjunction with the drawings.

DETAILED DESCRIPTION

Overall System

Figure 1:
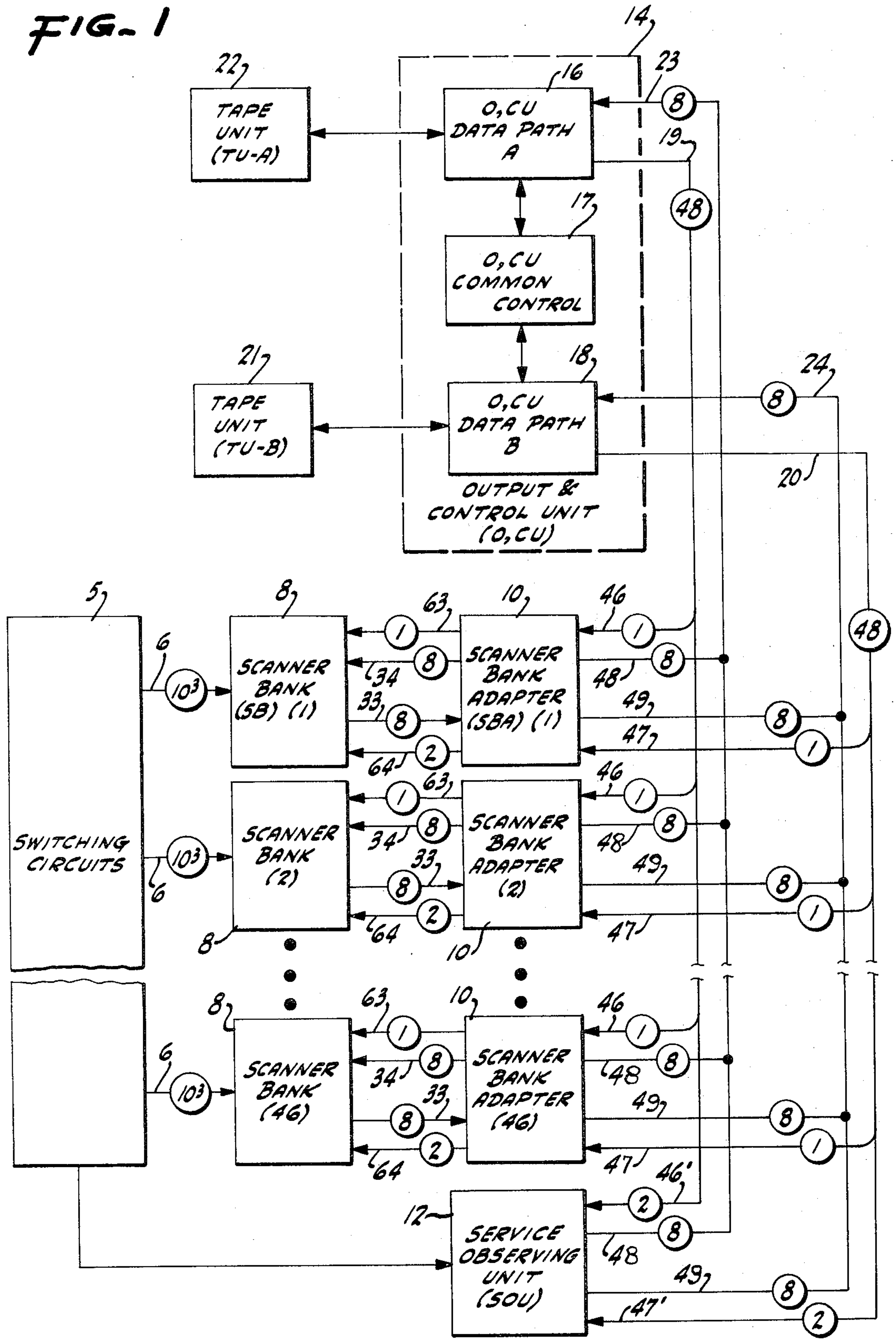
FIG. 1 depicts a schematic representation of the switching circuits from which a plurality of subscriber metering lines are derived and a message metering system which periodically polls the lines to determine and record subscriber usage information.

Referring to FIG. 1, a message metering system is depicted interconnected to subscriber metering lines. The subscriber metering lines 6 are output from switching circuits 5 and connected as inputs to the scanner banks 8. Switching circuits 5 are typically of the number 1 crossbar type well known in the field of telephony and which are shown and described in further detail in connection with FIG. 6.

In accordance with one embodiment of the present invention, the switching circuits are organized with outputs in groups of 1,000 ($10^3$). Those outputs correspond to the contiguous subscribers defined by the three low order digits of telephone directory numbers having common higher order digits. The directory numbers are in the base 10 numbering system. Each scanner bank 8 receives as inputs 1,000 subscriber metering lines, one line associated with each subscriber signal. The scanner banks, for convenience, are organized in accordance with the binary number system and have provision for 1,024 signals. The 24 extra locations, in addition to the 1,000 subscriber signals, in each scanner bank are employed in connection with fault checking features of the system. Each scanner bank 8 periodically gates out 1,024 signals, including the 1,000 signals on the subscriber line outputs, to bus 33 in groups of four subscriber signals at a time. The subscriber signals are each defined by two binary bits. An 8-bit binary input address bus 34 periodically addresses and selects the outputs on bus 33. Each address bus 34 and each data bus 33 is connected between a scanner bank 8 and an associated scanner bank adapter 10. Additionally, a line 63 and two lines 64 connect, for error checking and control purposes, from each scanner bank adapter 10 to the associated scanner bank 8.

Still referring to FIG. 1, each scanner bank adapter 10 receives one set from a total of 256 sets, of four 2-bit signals (eight lines) on buses 33 where the particular set of four is specified by the 8-bit binary address on bus 34. The address on bus 34 is derived from the scanner bank adapter 10.

The input data bus 33 to each scanner bank adapter 10 carries information in digital form about the subscriber usage. That information is analyzed by the adapter and stored to enable a data read out from the adapter at appropriate times to record the usage of the system by each subscriber. The information is read out on an output data bus 48 associated with the data path A. The selection of whether the data path A bus 48 or the data path B bus 49 is the active one is under the control of the select lines 47 and 46, respectively. The select lines 46 and 47 are each one of the 48 select lines in the 48-bit select bus 19 and the 48-bit select bus 20, respectively. The select lines 46 and 47 are energized by the output and control unit (OCU) 14. The 8-bit data buses 48 and 49 from each of the scanner bank adapters are all connected in common to the 8-bit data buses 23 and 24, respectively, which are input to the data path A circuitry 16 and the data path B circuitry 18, respectively, in the output and control unit 14. In addition to selecting one of the 46 scanner bank adapters 10 through appropriate selection of one of the 48 select lines 19 or one of the 48 select lines 20, the service observing unit 12 has two addresses which are selectable by two select lines 46' and 47' of the select lines 19 and 20, respectively, which are associated with the data path A and the data path B, respectively.

Still referring to FIG. 1, the output and control unit 14 has the data path A circuitry 16 connected to a tape unit 22 and the data path B circuitry 18 connected to a tape unit 21. Whenever the data path A or the data path B receives a signal from the SBA indicating that a subscriber line 6 has been active and the subscriber has terminated use of the subscriber line, the output and control unit recognizes the termination and causes the desired information about the subscriber's use of the system to be transferred out to the respective tape unit 21 or 22 depending upon whether data path A or data path B is operational.

No. 1 Crossbar Switch

Figure 6:
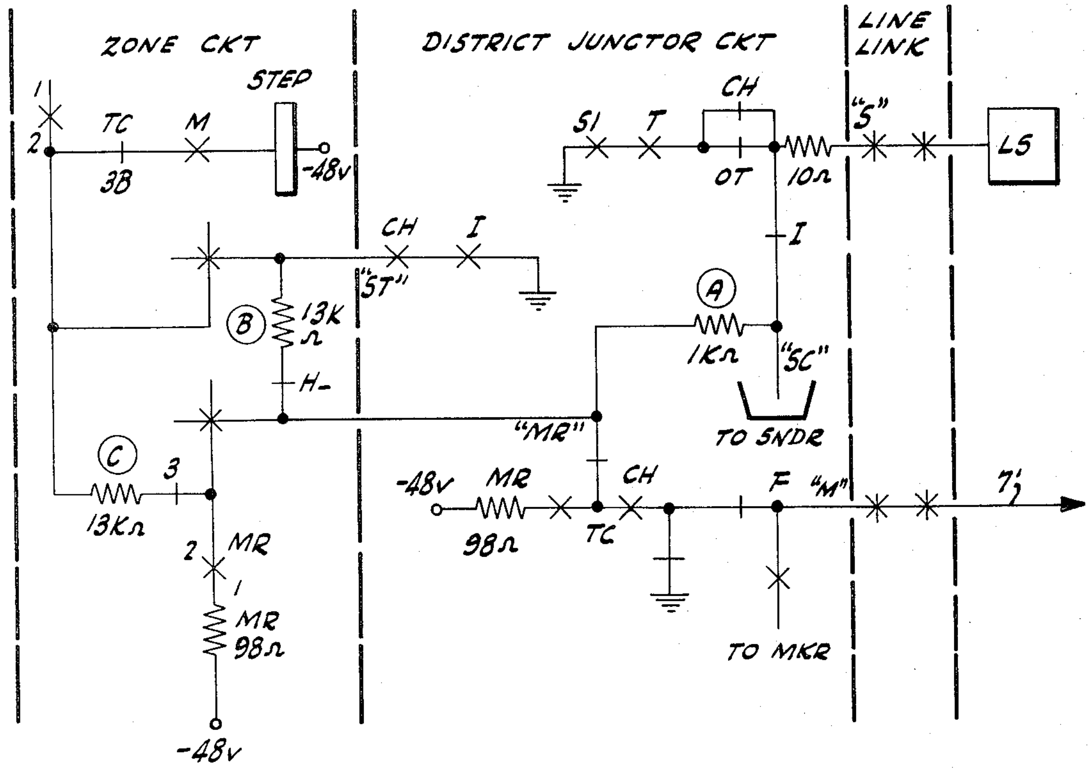
FIG. 6 depicts a schematic representation of a typical circuit from which the subscriber metering lines, output from the switching circuits of FIG. 1, are derived.

In FIG. 6, a portion of a standard No. 1 Crossbar Switch is shown representing the switching circuit 5 of FIG. 1. That standard switch is modified by the addition of two resistors (A and B) for each district juctor circuit and one resistor (C) for each zone registration and control circuit. Resistor A couples the sleeve lead to the M lead 7' through contacts of the F, CH, TC and 1 relays. The connection points for resistor A touch only leads terminating in other circuits so that wiring can be done on external terminal strips thus avoiding disturbing existing wiring in presently installed equipment. Resistor B is also conveniently connected at the zone connector crossbar switch. Resistor C is wired internally within each zone circuit. The M lead output line 7' is at one of four levels, −48, GND, +9 or +25 volts. Further details of the FIG. 6 circuit are described hereinafter.

Scanner Bank

Figure 2:
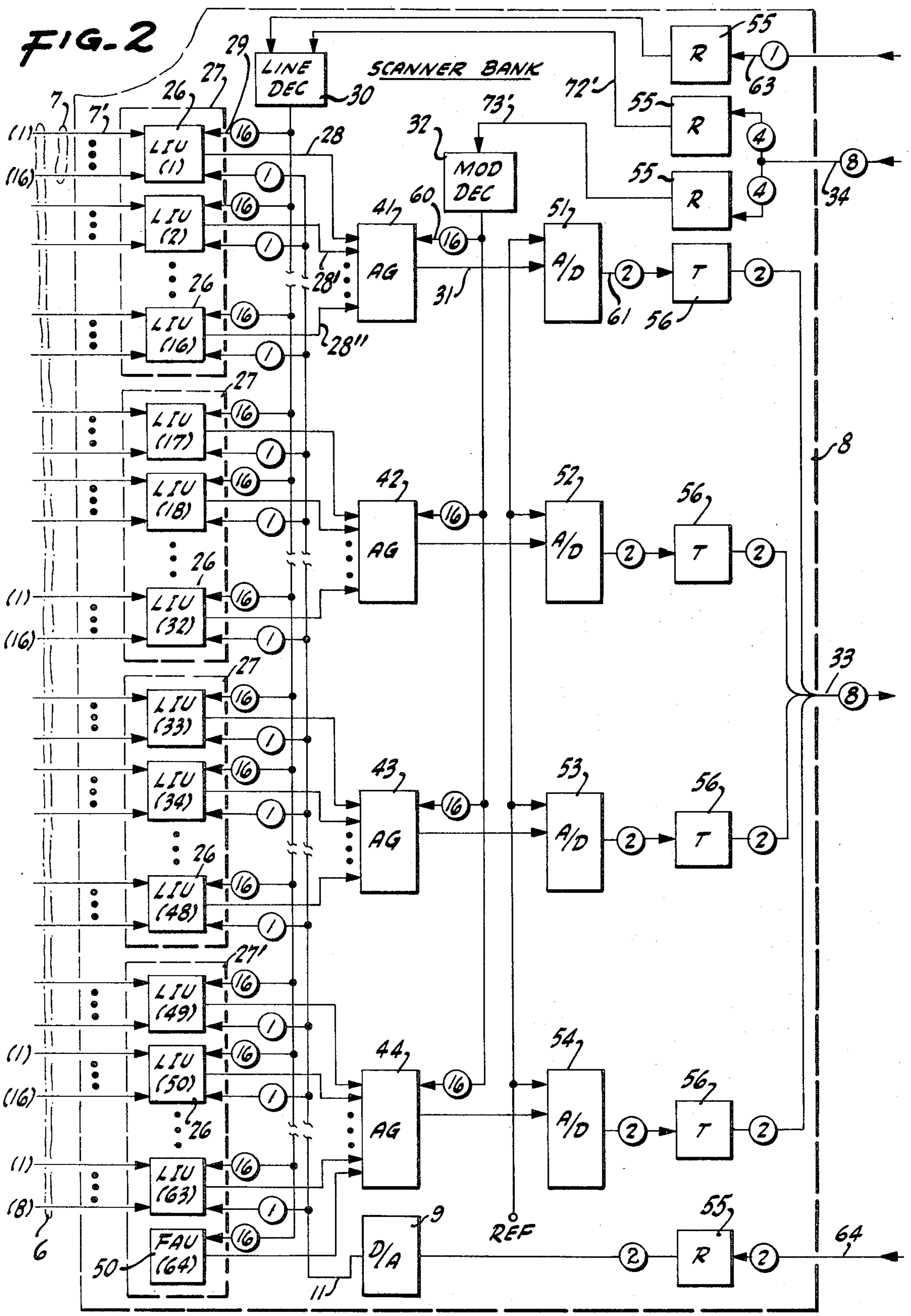
FIG. 2 depicts a schematic representation of one scanner bank which is typical of the plurality of scanner banks in the system of FIG. 1.

Referring to FIG. 2, a typical one of the scanner banks 8 of FIG. 1 is shown in detail. The 1,000 lines 6, derived from the switching circuit 5 of FIG. 1, are input to a plurality of line interface units (LIU) 26, with 16 inputs per unit. The 16 input lines 7 to the LIU 91) are typical. Each LIU functions under control of input address lines 29, to select one of the 16 input lines and connect it to output line 28 as shown, for example, in connection with LIU (1). The particular one of the 16 input lines is gated to the one output line by appropriate selection of one of the 16 select lines 29. The 16 select lines are derived from a line decoder 30 which receives and decodes a 4-bit binary input on lines 72' via receiver 55 and bus 34 to select one of its 16 outputs. Each of the 16 output select lines from the line decoder 30 is connected as an input to all the LIU units (1) through (63) and the fixed address-unit (FAU) 50. Groups of 16 LIU's 26 form a module 27 with 16 output lines connected as inputs to analog gates. Specifically, LIU (1), LIU (2), . . . , LIU (16) have their output lines 28, 28', . . . , 38'' connected as the 16 inputs to the analog gates 41. Similarly, the LIU (17) through LIU (32) have their respective outputs connected as the 16 inputs to the analog gates 43. Finally the LIU (49) through LIU (63) have their outputs connected as the 16 inputs to the analog gates 44. The analog gates 41 through 44 are each operative to select one of their respective 16 inputs to form a single output to an analog-to-digital (A/D) converter. Specifically, analog gates 41, 42, 43 and 44 each have an output 31 which is connected as an input to the analog-to-digital converters 51, 52, 53 and 54, respectively. The selection of which one of the 16 inputs to analog gates 41 is connected as the output on line 31 is controlled by one of the 16 select lines 60 input in common to each of the gates 41 through 44. The select lines 60 are derived from the module decoder 32 which receives a 4-bit binary input on lines 73' via receiver 55 and bus 34 and decodes it to energize one of its 16 outputs.

The operation of the decoders 30 and 32, in connection with the LIU's (1) through (16) and the analog gates 41 is to select one of 256 subscriber line output signals at any one time and connect that subscriber signal as an input to the analog-to-digital converter 51. The converter 51 senses the multivalue input on line 31 and encodes it into a 2-bit binary code on output lines 61. As previously explained in connection with FIG. 6, the signal on line 31 is typically at one of four levels (−48, GND, +9, +25 volts) defined after encoding by the two binary bits on lines 61. Lines 61 are connected as an input to the transmitters 56. Transmitters 56, one for each of the two lines 61, serve as a high impedance isolation, when connected through a corresponding receiver, between the scanner bank of FIG. 2 and the scanner bank adapter of FIG. 3. Simultaneously, the decoders 30 and 32 also select one of 256 of the subscriber signals from LIU's (17) through (32) for encoding to a 2-bit signal output from converter 52, one of 256 of the subscriber signals from LIU's (33) through (48) which produces the encoded output from converter 53, and one of the 232 subscriber signals from the LIU's (49) through (63) or one of the 16 fixed values from FAU (64) to produce the encoded or output from converter 54. The 2-bit outputs from each of the converters 51 through 54 are each, through transmitters 56, formed as the eight output lines of bus 33.

The LIU (63) includes only eight used inputs so that together with the 992 inputs of the LIU (1) through LIU (62) there are a total of 1,000 subscriber inputs 6.

The fixed address unit (FAU) 50 receives the 16 address bits on address bus 29 from the line decoder 30. The unit 50 has its 16 address locations wired to selected marginal values which test the "REF" input to each of the analog-to-digital converter 51 through 54. Additionally, the unit 50 when addressed, tests the threshold values within the converter 54. While the unit 50 has been shown with inputs only to converter 54 via gates 44, the fixed addresses can be distributed through the LIU (1) through (63) so that fixed addresses are connected to each of the converters 51 through 54 thereby testing each of those converters.

All of the LIU (1) through (63) have an analog input from line 11 derived from input 64 which is output from the scanner bank adapter 10 in FIG. 1. The input bits on line 64 function to define three values (high, normal and low) to test all of the units (1) through (63). Those three analog values are produced in the digital-to-analog (D/A) converter 9 on output line 11. Additionally, the line decoder 30 has an input via line 63 from the scanner bank adapter 10. That input line 63 functions to de-energize all units (1) through (64) so that none are selected.

Sanner Bank Adapter

Figure 3:
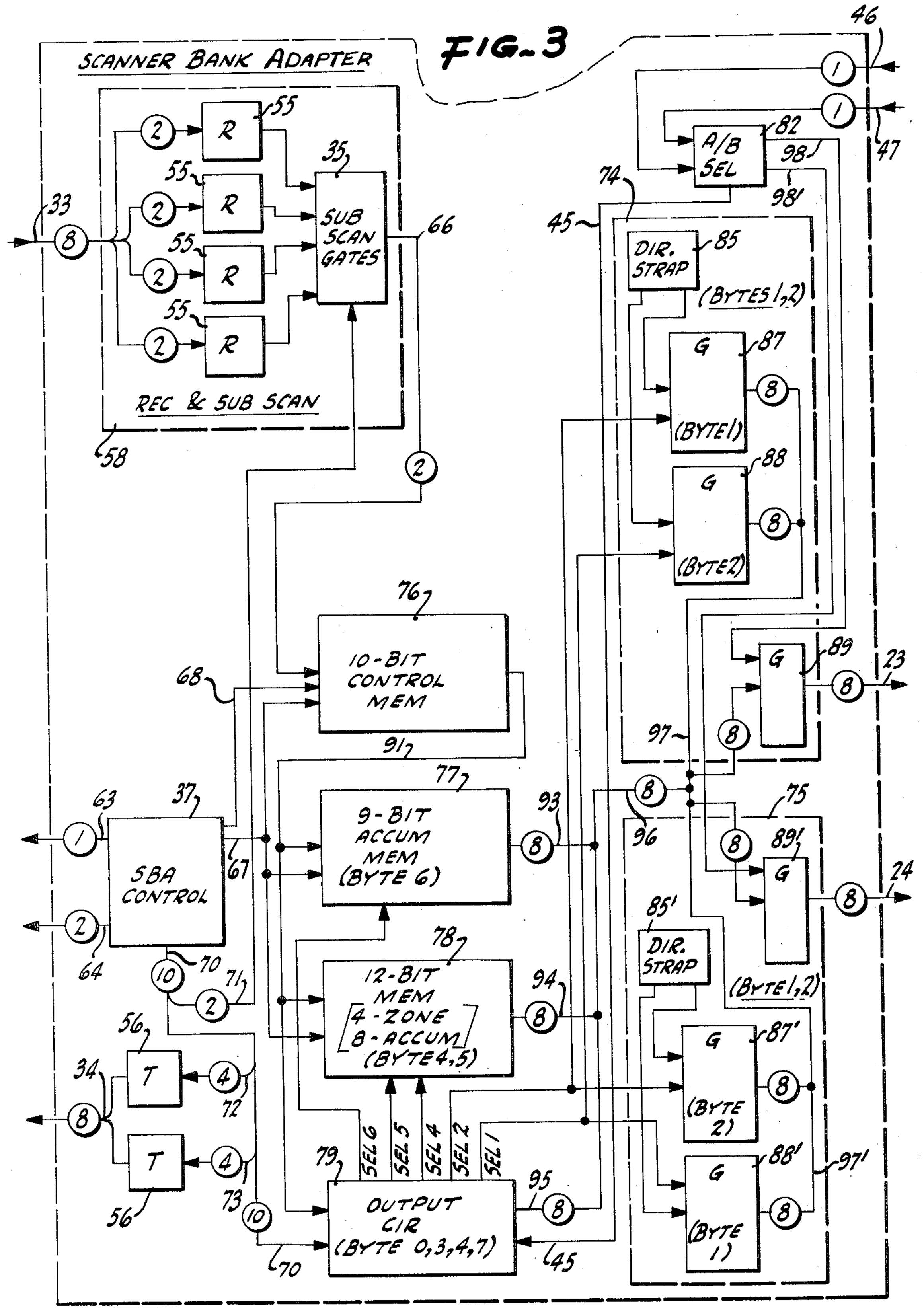
FIG. 3 depicts a schematic representation of one scanner bank adapter which is typical of the plurality of scanner bank adapters in the system of FIG. 1.

Referring to FIG. 3, a typical scanner bank adapter 10 of the scanner bank adapters of FIG. 1 is shown in detail. The scanner bank 10 includes a receiver and subscan circuit 58 which receives the input data bits on bus 33. Circuit 58 scans the four pairs of input lines on bus 33 one pair at a time in gates 35 to select a pair, representing a signal subscriber, as the output bus 66 from gate 35. Each one of the eight input lines for bus 33 is connected through a high impedance receiver 55. The selection of which of the four pairs of input lines on bus 33 is selected as the output 66 is under control of the two binary low order bits from the address generator in the SBA Control 37. Those two output low order bits appear on line 71 as an input to the gates 35. The binary control bits on line 71 are decoded in a conventional manner to select one of the four different pairs and connect the selected one on lines 66 as an input to the 10-bit control memory 76. Memory 76 has 1,024 10-bit storage locations, one each for the 1,000 subscribers signals, sixteen locations for the fixed addresses of the FAU (64) and eight additional locations for control and testing purposes. These eight additional locations account for the eight unused locations of LIU (63).

The 2-bit input line 66 to the memory 76 sequentially is connected to 1,024 different signals 1,000 of which represent usage information of telephone subscribers. The 2-bit binary code for each subscriber represents the four different states of each subscriber line 6 in FIG. 1 and that corresponding state for each subscriber is stored in the control memory 76. The memory address in the control memory 76 is incremented by the input from line 67 from the SBA Control 37 in synchronism with the subscan control line 71 so that subscriber addressing and memory addressing is carried out in synchronism.

The address signals for selecting subscribers or fixed addresses in the scanner bank of FIG. 2 are derived from the SBA Control 37 as an output on 10-bit bus 70. Bus 70 has its two low order bits connected on line 71 to the subscan gates 35 as previously described. The next higher order four bits appear on line 72 and are connected through transmitter 56 via bus 34 as an input in FIG. 2 to the receiver 55 and then via line 72′ to the line decoder 30 as previously described. Similarly, the highest order four bits are connected via line 73 through a transmitter 56 and bus 34 as an input in FIG. 2 to line 73′ to the module decoder 32 as previously described. Additionally, the 10 binary addressing bits of bus 70 are input to the output circuit 79 in FIG. 3.

The SBA Control 37 in FIG. 3 also generates a control signal on line 63 which connects to the line decoder 30 in FIG. 2 for de-energizing simultaneously all LIU. Similarly, control 37 has a 2-bit output on line 64 which connects as an input to all LIU and which is used for test purposes. SBA Control 37 has a one second timing circuit which delivers an output pulse on line 68 to the 10-bit control memory 76 for incrementing the time accumulation register in memories 77 and 78 associated with each subscriber as control memory 76 periodically addresses a control memory location corresponding to the subscriber connected on the input lines 66.

The accumulators associated with each subscriber for measuring the call duration have a lower order 8-bit field (plus a ninth parity bit) in a 9-bit accumulator memory 77. The memory 77 includes 1,024 locations associated on a one-for-one basis with the 1,024 locations in the 10-bit control memory 76, that is, one for each of 1,000 subscribers and 24 for control. Memory 77 is synchronously addressed by the input signal on line 67 in the same manner as 76. An additional 8-bits of accumulated memory, for each of the 1,000 locations associated with subscriber, exists in the 12-bit memory 78. Memory 78 is addressed synchronously with the memories 76 and 77 via the input on line 67. In addition to the 8-bit higher order accumulation field, memory 78 includes an additional four bits for storing zone information associated with each subscriber call.

The output circuit 79 functions to control the gating out of information stored in memories 77 and 78 and certain other information via one of two redundant data paths A and B. The first redundant path includes data path A circuitry 74 and the second data path B circuitry 75. Each of the data path circuits 74 and 75 via gates 87 and 88 and 87′ and 88′, respectively, operates to connect to the outputs on buses 23 and 24, at appropriate times, binary-coded-decimal representations of the higher order four digits of each subscriber's 7-digit telephone directory number. That connection is done by the directory number straps 85 and 85'. The outputs from gates 87 and 88 and 87' and 88' are OR'ed together to form outputs on lines 97 and 97' which are each connected in common with the output on bus 96 to form inputs to the gates 89 and 89'. Bus 96 is an OR'ed output of the bus 93 from memory 77, the bus 94 from memory 78 and the bus 95 from output circuit 79. The input 8-bit buses to gates 89 and 89' receive eight different bytes of data depending upon the selection output from output circuit 79. Those eight bytes of information and their contents are described hereinafter in further detail. Breifly, bytes 0, 3 and 7 and one-half of byte four are derived directly from the output circuit 79 and are gated over bus 95 to bus 96 as an input to gates 89 and 89'

The other half of byte 4 and all of byte 5 are gated by the SEL 4 and SEL 5 lines as outputs on bus 94 to bus 96 and to gates 89 and 89'. Byte 6 is gated by SEL 6 line as an output on bus 93 to bus 96 as inputs to gates 89 and 89'.

Bytes 1 and 2 are generated by the directory straps 85 and 85' and are gated as outputs on buses 97 and 97' as inputs to the gates 89 and 89', respectively.

The selection of which data path, data path A on bus 23 from gate 89 or data path B on bus 24 from gate 89' is under control of the A/B select circuit 82 responsive to inputs 46 and 47 from the output and control unit 14 of FIG. 1. Circuit 82 is operative to select either gate 89 via line 98 or gate 89' via line 98' depending on the energization of input lines 46 or 47, respectively. When either line 46 or 47 is energized, the select circuit 82 energizes output line 45 to the output circuit 79 for signaling that a byte 0 transfer is requested for that particular one scanner bank adapter 10 which is being selected in the system of FIG. 1. Only one adapter 10 in FIG. 1 is selected at any one time.

SBA Memories and Output Circuit

Figure 4:
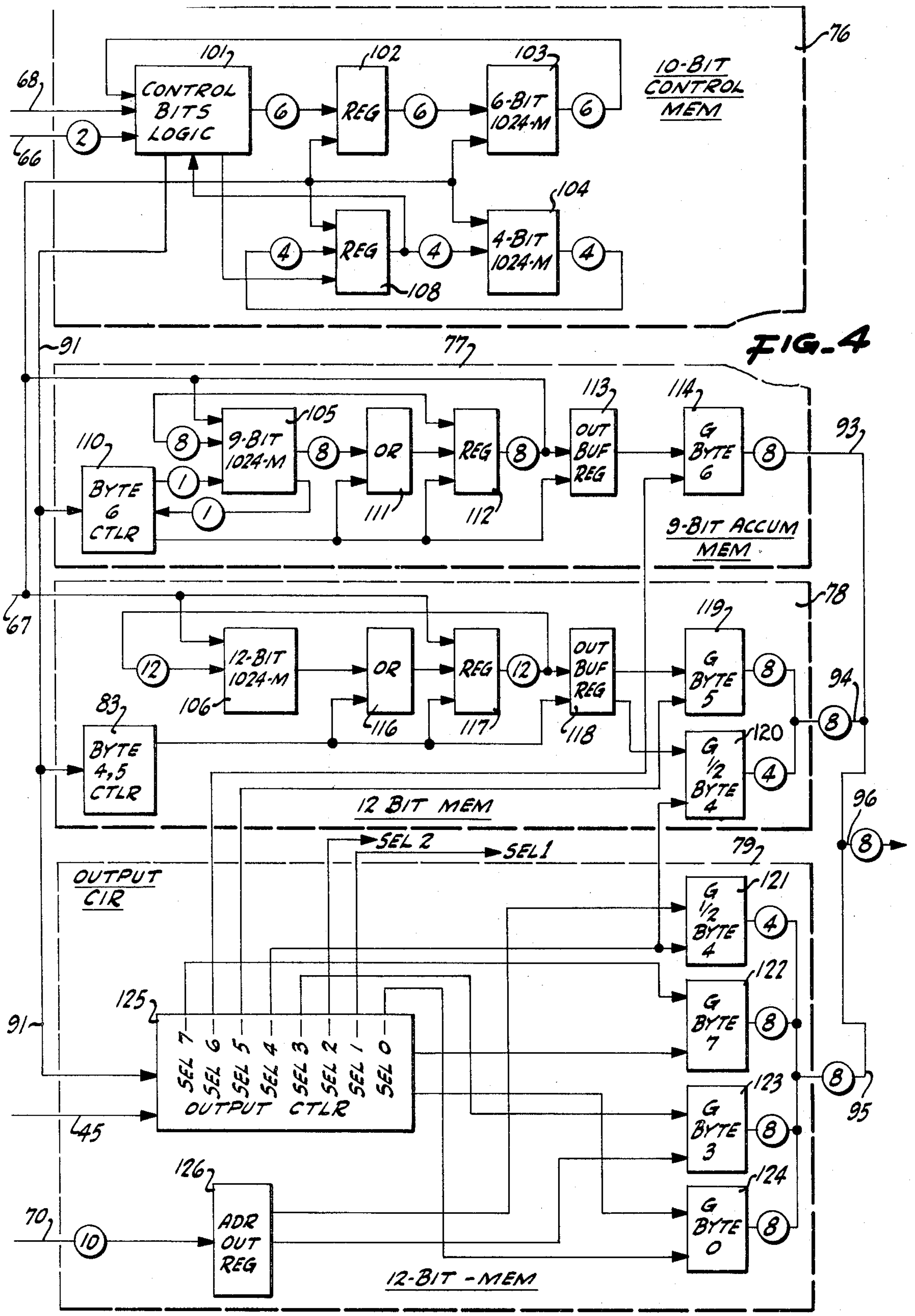
FIG. 4 depicts a schematic representation of the cyclically addressed memories and output circuits of the scanner bank adapters of FIG. 3.

In FIG. 4, the control memories 76 through 78 and the output circuit 79 of the scanner bank adapter 10 of FIG. 3 are shown in further detail. The 10-bit control memory 76 includes control bit logic 101 which receives the 2-bit encoded representation of subscriber signals on line 66, one at a time, as previously described and a 1 second timing input on line 68. The timing signals on line 68 are further described hereinafter in connection with FIG. 5. Memory 76 further includes a 6-bit, 1-state store in the form of register 102 and a 6-bit, 1,024-stage shift register store 103. The 6-bit field associated with registers 102 and shift register stages 103 includes 4 bits associated with the M lead (line 7', for example) status, 1 bit for indicating a busy condition and 1 bit for indicating an output flag. Together, the register 102 and the shift-register stages 103 provide 1,024 storage locations for six bits of control data. The data is shifted out of the shift register 103 back into the control bits logic 101 where it is modified by logic 101 and re-entered into register 102 from where it is inserted into the shift register stage 103. The circulation through the loop takes 1,025 stepping pulses which are received as clocking inputs on line 67 from the SBA Control 37 of FIG. 3 which is further described hereinafter in connection with FIG. 5.

Memory 76 stores and circulates an additional four bits through a 4-bit , one-stage store in the form of register 108 and a 4-bit, 1,024-stage shift register 104. Register 108 and shift register 104 are stepped in synchronism with register 102 and shift register 103 by the same stepping input on line 67. Register 108 is loaded from the control bit logic 101 and delivers its output back to the control bit logic 101 for storing an auxillary timing control field used for timing various events associated with the operation of memory 76.

The 9-bit accumulator memory 77 includes a 9-bit, 1,024-stage shift register 105. An 8-bit output from stages 105 is connected through OR gate 111 to an 8-bit, one-stage store in the form of register 112. The output from register 112 is reinserted at the input of shift register stages 105. Additionally, the output from register 112 is stored in an output buffer register 113 on command from the controller 110 which, under control of a SEL 6 line signal, is gated out on 8-bit buts 93 to bus 96. In memory 77, the byte six controller 110 functions to insert a parity bit associated with the circulating accumulated count in the memory stages 103, 104, 105 and 106. The memory 105 and register 112 are stepped by the stepping pulses on the input line 67. Controller 110 is responsive, via input line 91 from the control bits logic 101, to increment to count once in register 112, for each associated addressed subscriber signal on input line 66, in the conversation mode, for each timing pulse on line 68. The OR gates 111 are responsive to controller 110 to insert appropriate signals in the circulating accumulator in connection with control and testing functions of the system of FIG. 1.

The output buffer register 113 stores information whenever a disconnect signal indicates that a completed call has occurred and that data is to be read out to the output and control unit 14 of FIG. 1.

The 12-bit memory 78 includes a 12-bit, 1,024-stage shift register 106 which connects through OR gates 116 to a 12-bit, one-stage store in the form of register 117. The output of register 117 connects as the input to stages 106. Register 117 is gated out through a 12-bit buffer register 118 which has an 8-bit output through gate 119 and a 4-bit output through gate 120. The memory 78 stores in an 8-bit field an additional higher order eight bits of the accumulator field of which the lower order eight bits are stored in memory 77. Whenever an overflow is indicated from the 8-bit lower order accumulator field of memory 77, the byte 4, 5 controller 83 causes an input to register 117 which increments the accumulator field associated with the currently addressed subscriber line on input line 66. The additional 4-bit field in memory 78 associated with the output gate 120 is for recording called zone information associated with the subscriber call for the subscriber on the currently addressed subscriber input on lines 66. The memory 106 and register 117 are incremented by the stepping pulses on input line 67 in the same manner as memories 76 and 77. The higher order eight bits of the accumulator field for memory 78 are gated out by gates 119 whenever the SEL 5 line is energized. One half of the zone field information is gated out by gate 120 whenever the SEL 4 line is energized. The output from gates 119 and 120 are connected in common via the 8-bit bus 94 to form outputs on the 8-bit bus 96.

The output circuit 79 of FIG. 4 includes an output controller 125 for energizing the eight select lines SEL0, SEL1, . . . ,SEL7. Additionally, the output circuit 79 includes an address output register 126 which receives the 10-bit bus 70 from the SBA Control 37 of FIG. 3. Register 126 has its output connected to gate 123 and gate 121 which in turn have their outputs connected to the output bus 95 in turn connected to output bus 96. Circuit 79 additionally has output gates 122 and 124 for gating information out via bus 95 to bus 96.

The selection lines output from the controller 125 select desired ones of the output gates 114 and 119 through 124 as described hereinafter in further detail.

Output controller 125 operates to select those output gates based upon input information from lines 91 derived from the control bits logic 101 of control memory 76. Output controller 125 is additionally operable in response to the signal on line 45 from the selection circuit 82 in FIG. 3. Further details as to the operation of the controller 125 in selecting bytes of output data is described hereinafter in connection with the description of the operation of the FIG. 1 system.

SBA Control

The SBA Control 37 of FIG. 3 functions to control the addressing of the memories 76, 77 and 78 in FIG. 3 via its output line 67 which steps those memories one address location at a time. Simultaneously, Control 37 controls the addressing of the 1000 subscriber lines and the 24 control locations associated with the scanner bank of FIG. 2. Specifically, Control 37 addresses the subscriber lines via the 10-bit output binary bus 70 where the two low order bits, via line 71, connect to the subscan gates 35 in FIG. 3 and where the eight high order bits connect to the scanner bank 8 via the output bus 34, through transmitters 56.

Figure 5:
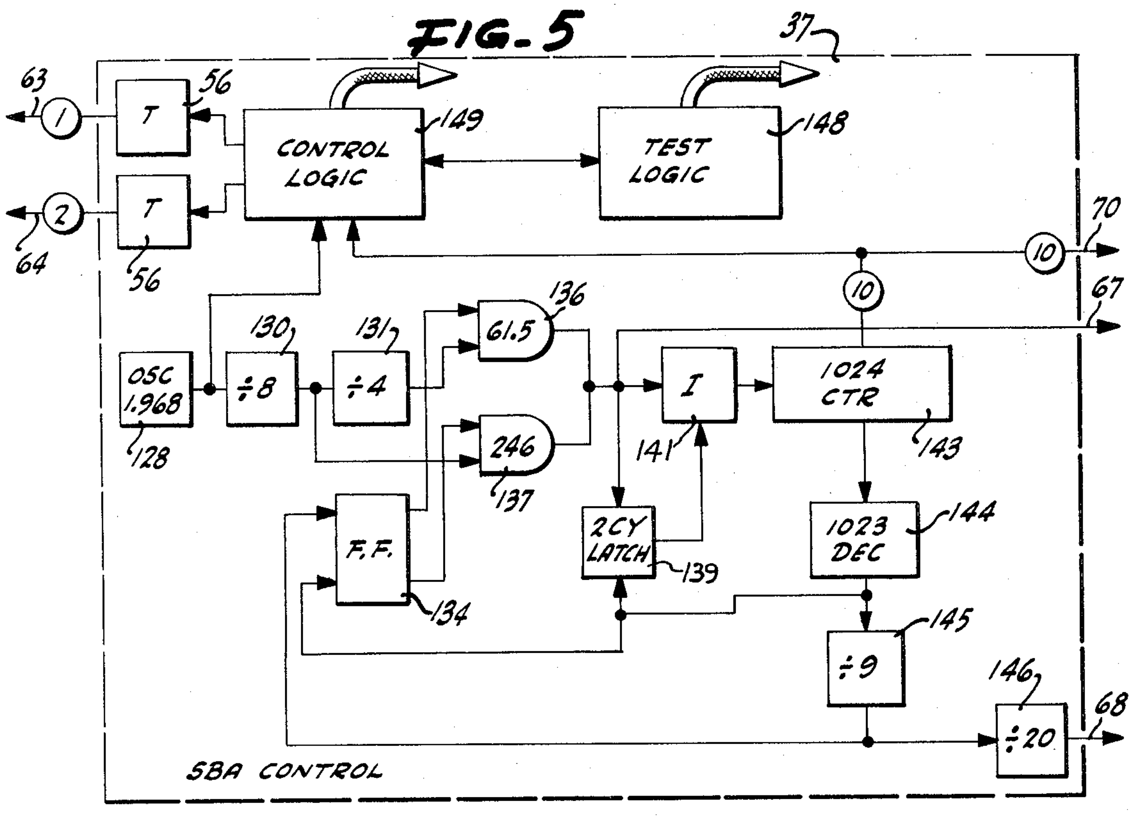
FIG. 5 depicts a schematic representation of SBA CONTROL in the scanner bank adapters of FIG. 3.

In FIG. 5, the SBA Control 37 is shown in further detail. Control 37 includes an oscillator 128 having a frequency of 1.968 MHz which connects as an input to a divide-by-eight circuit 130 which produces a 246 KHz output as an input to a divide-by-four circuit 131 and as an input to gate 137. The divide-by-four output produces a 61.5 KHz output connected as an input to the gate 136. Gates 136 and 137 are responsive to control flip flop (FF) 134 for selecting one of the output frequencies 61.5 or 246 KHz which are connected to an inhibit circuit 141, to a two-cycle latch 139, and to the output stepping line 67. Except when inhibited by the latch 139, the inhibit circuit 141 connects the output from the selected one of the gates 136 and 137 into a 1,024 counter 143. Counter 143 is conventionally a 10-stage binary counter having the 10-bit output bus 70 which connects, as previously discussed, as the addressing output for addressing the subscriber and control locations.

Counter 143 also has an output to a 1,023 decode circuit 144 which functions to detect whenever the 1,024 counter 143 is in the 1,023 count state. Each complete cycle of counter 143 causes one occurrence of the 1,023 value thereby providing an output from the 1,023 decoder per cycle. Each output from the 1,023 decoder 144 is connected as an input to the two cycle latch 139 which functions to inhibit via inhibit circuit 141 any input to the counter 143 for one cycle of the signal output from either of the gates 136 or 137. Also, the output from the 1,023 decoder 144 passes through a divide-by-nine circuit 145 and from there to a divide-by-20 circuit 146. The output from the divide-by-nine circuit 154 is an input to flip-flop 134 which causes the flip-flop 134 to energize gate 136 and to energize gate 137 thereby selecting the higher output frequency of gate 137 once every nine cycles of counter 143 until counter 144 is reset after the ninth pulse. Divide-by-nine circuit 145 is typically a 4-bit binary counter which is reset after the ninth count. Similarly, divide-by-20 circuit 146 is typically a 5-bit binary counter reset after the 20 count.

The operation of the two cycle latch 139 in combination with the inhibit circuit 141 is to cause counter 143 to skip one count relative to the number of outputs on line 67 each cycle of counter 143. More specifically, for each revolution of the counter 143, there are 1,025 output pulses on line 67. Each time the counter 143 reaches the 1,023 state (once per cycle) it sets the two cycle latch 139 which causes inhibit circuit 141 to inhibit from counter 143 one of the pulses output from gates 136 or 137. That inhibited pulse, however, is output on line 67 to make a total of 1,025 output pulses per 1,024 count revolution of counter 143.

The SBA Control 37 of FIG. 5 further includes control logic 149 and test logic 148 for controlling and testing the operation of the system of FIG. 1. Specifically, control logic 149 produces through output transmitter 56, the 1-bit control signal 63 and the 2-bit control signal 64 transmitted to the scanner bank of FIG. 2 as previously described.

Output and Control Unit

Figure 7:
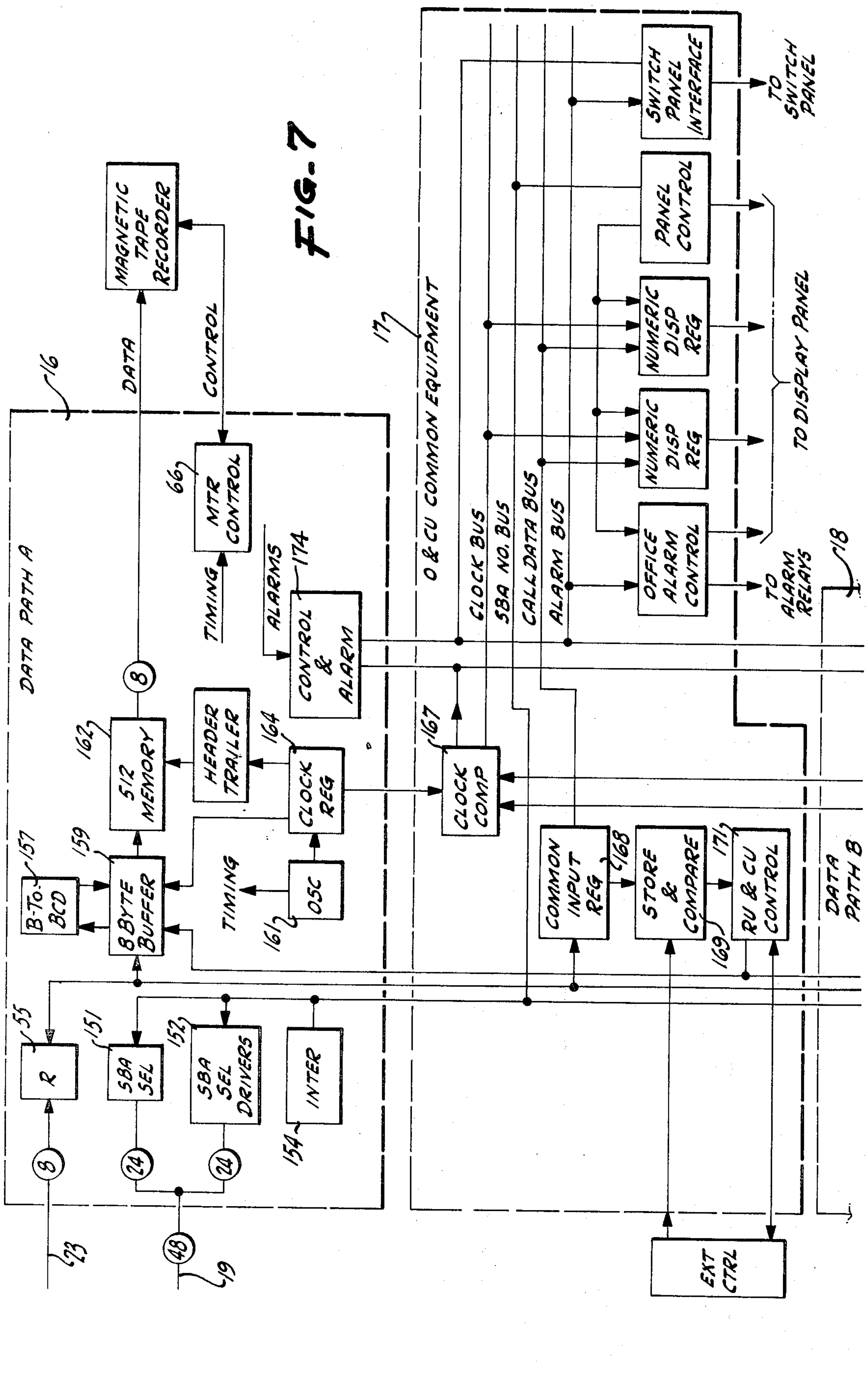
FIG. 7 depicts a schematic representation of the output and control unit of the system of FIG. 1.

In FIG. 7 the output and control unit 14 of FIG. 1 is shown in further detail. The data path A circuitry 16 includes receivers 55 for receiving the data path A bus 23. The receivers 55 have outputs connected as inputs to the eight byte buffer 159 and to the common input register 168 for use by the common equipment 17. The data path A circuitry 16 further includes SBA selection circuits 151 and 152 for periodically selecting in sequence the scanner bank adapters (1) through (46) and the two locations (47) and (48) in the service observing unit 12 of FIG. 1. The selection of those units, one at a time, is carried out by the sequential energization, one at a time, of the 48 output lines in bus 19. When the selected one of the scanner bank adapters 10 of FIG. 1 has its output bus 12 connected as an input to the data path A circuitry 16, 8-byte 0, from gate 124 in FIG. 4 responsive to the SEL 0 line, is transmitted through receivers 55 to the buffer 159 and to the register 168. If byte 0 contains a flag in the bit 3 position, indicating that the corresponding subscriber conversation has terminated, the seven additional bytes 1, 2, . . . ,7 of data are transmitted via bus 23 for storage in the eight byte buffer 159. Buffer 159 has thereafter gated through a 512 bit memory 162 via an 8-bit output data path to a magnetic tape recorder to other external storage.

The clock register 164 inserts the time of day in minutes into the eight bytes of data in buffer 159. The B-to-BCD converter 157 in the data path A circuitry functions to convert the three lower order base 10 digits of the subscriber directory number, defined by the 10 binary address bits in bytes 3 and 4, to binary-coded-decimal format before transmission to the buffer memory 162 and the magnetic tape recorder. The Output and Control unit of FIG. 7 includes data path B circuitry 18 (not shown) which is identical to the data path A circuitry 16. Each data path includes extensive error detecting circuitry for detecting if an error occurs. Upon detection of an error, control and alarm unit 174 causes data transmission to be switched from the error causing path to the other.

OPERATION

M-Lead Subscriber Signal

Referring to FIG. 6 in combination with the multimessgage unit call signal of FIG. 8, the circuit action is as follows. When the line link crosspoints are open (no call in progress) at T0, the M lead 7' potential is +25 volts.

When the calling party LS goes off-hook the crossbar equipment initiates actions which results in the line link crosspoints S being closed. When those crosspoints close at $t_1$, the M lead potential on line 7' drops to frame ground GND provided through a break-contact of the CH relay in the district junctor circuit. The crossbar equipment then functions to provide dial tone to the calling customer.

When the F relay in the district junctor operates at $t_2$ in preparation for the marker M lead test, the M lead is open circuited because the district link and connector circuit has not yet closed the connection between the district junctor and marker circuits. At this point, $t_2$, the M lead potential returns to +25 volts.

When the district link contacts close at $t_3$, the M lead is attached momentarily to +130 volts through two marginal relays.

When the F relay in the district junctor releases at $t_4$, the M lead potential returns to frame ground GND through a break-contact of the CH relay. The M lead remains grounded until at t5 the called party answers. Should the calling party go on hook before the called party answers, the M lead will return to the +25 volt idle condition with no subsequent action by the system of FIG. 1. When the called party answers (on a MMU call) the CH relay will operate after a short charge delay, connecting the M lead through the H relay to a 13K ohm resistor, this circuit being previously attached by the originating marker. Voltage division between the 13K ohm resistor in the zone circuit and the input resistance of line 7' causes the M lead potential to reach the +9 volt (charging) level.

Three to five hundred milliseconds later at $t_6$ the zone circuit will place the first (between $t_6$ and $t_7$) of up to six, −48 volt pulses on the M lead by operating and releasing the MR relay. When the MR relay operates at $t_6$, the M lead potential reaches approximately −48 volts. When the MR relay releases the M lead returns at $t_7$ to −9 volts. When the system of FIG. 1 at $t_7$ first detects a change from −48 volts to +9 volts, it begins updating the elapsed time register in a memory slot associated with the subscriber calling line. The elapsed time register is updated as long as the M lead remains at either +9 volts or −48 volts. Initiating the elapsed time update sequence from the −48 volt to +9 volt transition rather than sensing a single voltage level insures that a momentary false cross will not result in a false billing to a subscriber.

In addition, the first −48 volt to +9 volt transition opens a timed window during which zone impulses are counted. This window is wide enough to insure that the maximum number of zone pulses can be counted. At the end of the timed window the number of pulses received is placed in a memory slot associated with the subscriber calling line. In the example of FIG. 8, two zone pulses occur, one from $t_6$ to $t_7$ and one from $t_8$ to $t_9$. In addition to counting the number of −48 volt pulses the system of FIG. 1 times the width of each of those pulses. If a pulse width exceeds the known maximum, a flase cross to −48 volt detector is activated. Detection of false −48 volts on the M lead is a valuable trouble detection feature. As long as the talking path remains closed (called and calling parties off-hook) the M lead potential remains at +9 volts which is the charging condition which causes the elapsed time register accumulator in memories 77 and 78 to be updated. After $t_9$, the zone circuit has completed its function in indicating the zone called, and the system is timing the call in the memories 105 and 106 of FIG. 4. The zone circuit can be released, therefore, to serve other calls. This release is in contrast to typical operation that requires the zone circuit to be attached for the duration of the call. Releasing the zone circuit early provides a large increase in the traffic handling capability of existing circuits and thus reduces the occurrence of lost revenue caused by lack of an idle zone circuit.

The next change of state on the M lead occurs when either the calling or called party goes on-hook. If, for example, the called party goes on-hook first, the M lead potential fails to value very near frame ground at $t_{10}$ as caused by voltage division between the input impedance of line 7' and resistor A in the district junctor circuit. When the called party goes on-hook, the I relay releases removing resistor B or C whichever is connected, and coupling resistor A from the M lead to the sleeve lead. The sleeve lead holding ground will still be present at this time since the linkage is not directly controlled by the called party. The sleeve ground provides the desired voltage division path. When the M lead potential falls to near ground at $t_{10}$ the system of FIG. 1 stops updating the elapsed time register accumulator in memories 77 and 78.

Figure 8:
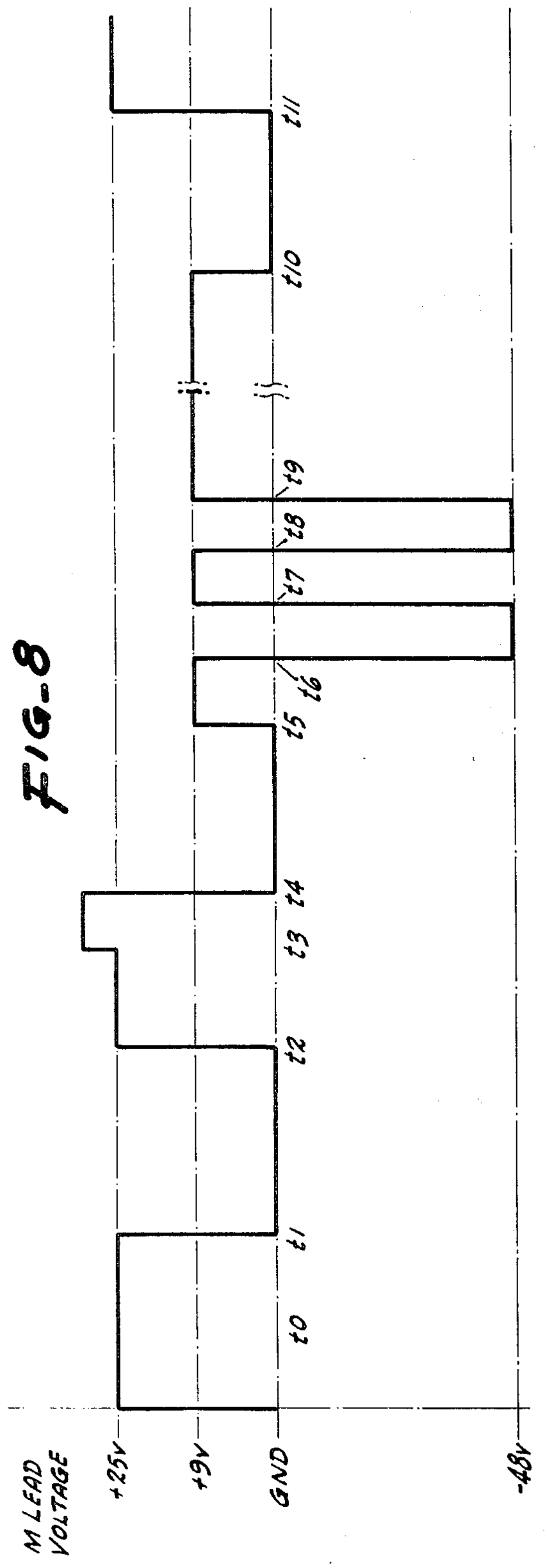
FIG. 8 depicts a schematic representation of waveforms typical of the signals on the metering lines of the FIG. 1 system.

For a single message unit call, the waveform differs only slightly from the multimessage unit waveform of FIG. 8. In the single message unit case, the zone registration and control circuit is not attached by the originating marker. The district junctor provides the one −48 volt pulse required by releasing slow release relay TC with contacts of the CH relay. Because the TC relay will have been previously operated before CH operates, the M lead potential will drop directly to −48 volts from the frameground GND condition. The elapsed time register is updated only after the first transition from −48 volts to +9 volts has occurred as in the multimessage unit case.

Metering System Operation

The message metering system of FIG. 1 operates to sense and analyze the multistate signals, like that typically shown in FIG. 8, for each subscriber in the switching circuits of FIG. 5. It is assumed, for example, that the signal of FIG. 8 represents the signal on line 7' as an input to LIU (1) in FIG. 2. The FIG. 8 signal is transmitted to the analog gate 41 when line decoder 30 selects the address, as specified by four address bits, of input line 7' and connects it as the output on line 28. Typically, line 7' is address 000 where the three 0'S represent the three base 10 lower order digits of a directory number. The appropriate one of the analog gates 41 is further selected by the module decoder 32, as specified by the four high order address bits, selecting LIU (1) and connecting input line 28 to line 31 which connects the signal of FIG. 8 on line 7', as attenuated by the transmission path, to the A-to-D converter 51. Simultaneously, with the connection of input line 7' to the A-to-D converter 51, three other similar signals (not shown) are connected via gates 42, 43 and 44 to the A-to-D converters 52, 53 and 54. A-to-D converter 51 continuously compares the amplitude of the signal on line 31 with the REF input signals to form digital outputs on line 61 representative of the four different states (−48, GND, +9 and +25 volts). Each time the amplitude of the signal of FIG. 8 changes, the encoded value on lines 61 also changes. For example at +25 volts the code is typically (11), at +9 volts it is typically (10), at GND typically (01) and at −48 typically (00). Using those codes the output on lines 61 between the times $t_0$ and $t_1$ is (11), between $t_1$ and $t_2$ the output is (01), between $t_5$ and $t_6$ the output is (10) and between $t_6$ and $t_7$ the output is (00).

Transmitters 56 via bus 33 transmit the encoded value on lines 61 through the corresponding receivers 55 in FIG. 3. The subscan gates 35 in FIG. 3, under control of the two low order address bits, selects the encoded value from converter 51 as the output on line 66. The addressing of SBA Control 37 in FIG. 3 functions, therefore, to connect the subscriber line 7' encoded value as the input to control memory 76 on line 66. Simultaneously, with the addressing of subscriber line 7' the stepping pulse outputs on line 67 have stepped (or addressed) the memories 76, 77 and 78 to a unique one of 1,024 locations corresponding only to subscriber line 7'. The 10-bit control memory 76 functions to store the value of the encoded signal on line 66 but does not change the control memory stored value until the addressing is completely cycled through all subscribers and again returns to line 7'. After two successive scans of line 7', which occurs after two cycles of the counter 143 in the SBA Control of FIG. 5, the memory 76 is updated if the result of the scans is identical. The requirement of two successive like scans of the signal on line 7' before changing the memory helps to reduce errors in the signal detection and is form of digital integration. The frequency of scanning signals on line 7' and on each of the other subscriber lines is of the order of five times the minimum valid pulse width of any pulse of the FIG. 8 type which are produced by the FIG. 6 type circuits.

Referring to FIG. 8, the calling party on-hook condition is sensed by a (11) code on line 66 to memory 76 at $t_0$. Thereafter, at $t_5$ the called party off-hook condition is sensed by a (10) code on line 66 to control memory 76. Control logic 101 senses and stores those conditions and analyzes them to determine that a call has been initiated and, therefore, commences timing of the call duration at time $t_7$ after the first zone pulse between $t_6$ and $t_7$. The call duration is timed under control of logic 101 which functions to insert timing bits into the accumulators of memories 77 and 78, at locations unique to the subscriber line 7', each time a timing pulse is received on timing line 68 while the initiated call commenced at $t_7$ continues. Additionally, the controller 83 causes the zone count 4-bit memory 78 to be incremented to count the number of zone pulses, that is, each time the signal on input line 66 of FIG. 3 goes to the 00 level. The zone information is stored in four bits of the 12-bit circulating memory which are uniquely associated with the subscriber of line 7'.

The accumulators of memories 77 and 78 are continually incremented with 1 second pulse timed by line 68 in FIG. 4 until the call duration terminates at time $t_{10}$ in the FIG. 8 waveform. When a termination of a properly initiated call occurs either by the called party or the calling party going on-hook, control bits logic 101 senses the termination and sets an output flag in the 6-bit control field of memory 103. The output flags are available via lines 91 to the output controller 125. Output controller 125 stores a call terminated flag in the byte 0 position whch indicates that the select lines SEL0, SEL1, . . . ,SEL7 are to be sequentially energized for gating out in addition to byte 0, the seven bytes 1, 2, . . . ,7 from the scanner bank adapter (1) which are associated with line 7' subscriber. The bytes are gated out when the SBA (1) is selected by a signal on lines 46 or 47 from the control unit 14. Each time control unit 14 selects SBA (1), a byte 0 of data is sent to the control unit 14. If that byte 0 has the call termination flag set, that byte 0 flag indicates to the control unit 14 that a data readout of seven more bytes is to occur from the scanner bank adapter (1). While any of the 1,000 subscribers associated with SBA (1) can set the byte 0 flag, the present example assumes that line 7' is responsible. The transfer of data from SBA (1) of any of the SBA to the unit 14 is asynchronous with respect to the SBA scanning. Specifically, the output buffer registers 113 and 118 allow readout from memories 77 and 78 to be controlled by the unit 14 timing. Further, since each SBA has its own timing (oscillator 128 in FIG. 5) each SBA is independent from each other.

Assuming that data path A circuitry 16 rather than data path B circuitry 18, is operational the 8-bit byte 0 transfer from SBA (1) to circuitry 16 includes bits 0 through 7. Bits 0 through 7 include the information "Response," "SBA Parity," "SBA Fail," "Output Flag," "LIU Fail," "SB Fail," "SB Power Fail," "Response," respectively. With the bit 3 "Output Flag" set in byte 0, byte 1 is thereafter transmitted to unit 14 by energization of the SEL1 line from the controller 125 in FIG. 4 which in turn energizes gate 87 in FIG. 3. Byte 1 includes 8-bits of binary-coded-decimal information defining the directory strap number established by strap circuit 85 in FIG. 3. Similarly, the SEL2 output from the output circuit 79 selects gate 88 which gates an additional eight bits of binary-coded-decimal directory strap information also set by circuit 85 in FIG. 3. Bytes 1 and 2, therefore, include 16 bits of binary-coded-decimal information which define the four higher order digits of the subscriber directory numbers for the subscribers associated with lines 6 in FIG. 2 which includes the subscriber of line 7'.

For byte 3, the SEL3 line from the controller 125 of FIG. 4 energizes gate 123 which selects the low order eight binary bits of the binary address of the subscriber associated with line 7'. For byte 4 the SEL4 line is operative to gate out the two remaining binary bits of the subscriber address from register 126. Those bits are in bit locations 2 and 3 of byte 4. Byte 4 also includes four bits of zone information output from gate 120 in bit locations 4, 5, 6 and 7. Bits 1 and 2 of byte 4 are unused.

For byte 5, the SEL5 line is operative to gate out the higher order eight bits of the accumulator memory 78 which bits represent, in part, the length of the conversation period from $t_7$ to $t_{10}$ in the FIG. 8 waveform. For byte 6, the SEL6 line is operative to energize gate 114. Byte 6 includes the lower order eight bits of the accumulator of memory 77 which measures with byte 5 the duration of the conversation period from $t_7$ to $t_{10}$ of the FIG. 8 waveform.

For byte 7, the SEL 7 line from the controller 125 is operative to energize gate 122. Byte 7 includes flags in the lower order 4-bit positions which are useful for control purposes of the system of FIG. 1. The locations 4 and 5 of byte 7 include data 1's for indicating that it is the last byte of data transferred by the scanner bank adapter. Bit locations 6 and 7 of byte 7 are unused.

The data path A circuitry 16 of FIG. 7 receives the eight bytes of data transmitted by the SBA (1) and stores them in the eight byte buffer 159. Byte 3 and part of byte 4 employ the B-to-BCD converter 157 to convert the binary address of the three low order subscriber digits into binary-coded-decimal format. Thereafter, the byte 1 through byte 7 information identifying the subscriber of line 7' and the line 7' usage of the system is gated to the memory 162. Additionally, the time of day in minutes is inserted into the vacant bit positions of byte 4 and byte 7. If a test call has occurred in the system as recognized by the common equipment 17, a flag is inserted into the buffer byte 7 locations in bit 4 and bit 5. From memory 162 bytes 1 through 7 are transmitted to the external magnetic tape recorder.

In connection with many of the circuit interconnections of the present invention, transmitters 56 and receivers 55 have been shown and are for the purpose of providing electrical isolation so that the interconnection between the transmitter and receiver can be a relatively long distance. The receivers 55 are typically implemented with light emitting diodes and phototransistors which have a very high impedance to ground and therefore achieve good electrical isolation.

Operation Modes

As was previously indicated in connection with the description of FIG. 5, the address counter 143 of FIG. 5 is stepped at two different frequencies. During the scanning mode when each of the subscriber lines is sent as controlled by the output from gate 136 in FIG. 5, the system addresses each subscriber line and updates the memories 76 through 78 in FIG. 3 in the manner previously described. The addressing of each subscriber occurs over a 16⅔ millisecond period once each 50 milliseconds. During the remainder of the 33⅓ milliseconds of each 50 millisecond period, gate 137 is in operation for controlling scan out of information via the buffers 113 and 118 in FIG. 4 and through the gates 114 and 119 through 124 of FIG. 4 and gates 87, 88 and 89 and 87', 88' and 89' of FIG. 3 all in a manner previously described.

Figure 9:
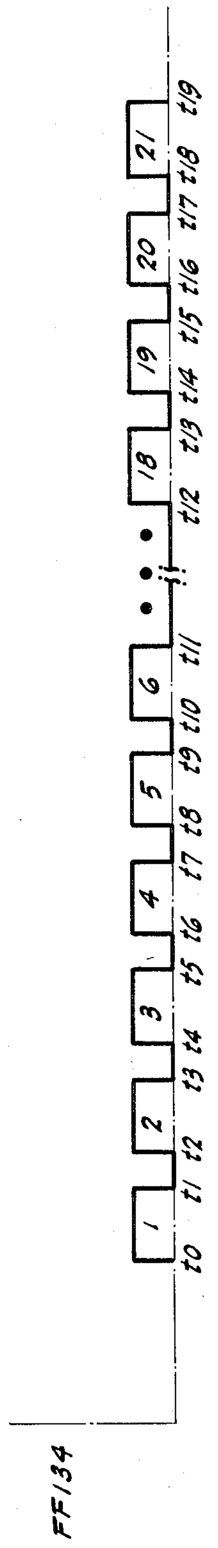
FIG. 9 depicts a schematic representation of the cyclic operation of the message metering system of FIG. 1.

Referring now to FIG. 9, the waveform showing the scanning and output cycles in terms of the output from flip flop 134 of FIG. 5 is shown. The periods from $t_0$ to $t_1$, $t_2$ to $t_3$, $t_4$ to $t_5$ and so each represent the output mode. Similarly, the periods from $t_1$ to $t_2$, $t_3$ to $t_4$, and so on represent the scanning mode. During the output mode, the counter 143 of FIG. 5 makes eight complete cycles while during the scanning mode the counter 143 makes one cycle. In this manner, the addressing of the memory locations for the readout mode is carried on at a different frequency than the addressing for the scanning mode. After the 10 50 millisecond period shown by pulse 20 in FIG. 9, an output timing pulse occurs on line 68 in FIG. 5 which represents 1 second.

We claim:

1. A message metering apparatus for metering the usage of a plurality of subscriber units in a telephone system, the improvement comprising, circuit means for carrying multistate subscriber signals associated with each subscriber unit for indicating subscriber unit usage of the telephone system, addressing means for addressing said circuit means to access a multistate subscriber signal for each subscriber unit, sensing means connected to said circuit means and responsive to said addressing means a multistate subscriber signal for each subscriber unit, and memory means having memory locations corresponding to each subscriber unit, said memory means having means for addressing said memory locations concurrently with the addressing of said circuit means for storing usage information derived from each multistate subscriber signal in the corresponding memory location.

2. The apparatus of claim 1 wherein said circuit means includes at leat one metering line for each subscriber unit and includes means for each subscriber unit for generating said multistate signal as a multilevel signal on said metering line.

3. The apparatus of claim 2 wherein said sensing means further includes an analog-to-digital converter for encoding said multilevel signal to a digital code for storage in said memory means.

4. The apparatus of claim 3 wherein said analog-to-digital converter includes a transmitter and receiver for connecting said analog-to-digital converter to said memory means with electrical isolation whereby the memory means is not adversely affected by placement at a remote location from said analog-to-digital converter.

5. The apparatus of claim 2 wherein said addressing means includes an address counter for specifying said addresses and means for stepping the address counter and for concurrently stepping the address of said memory means whereby each subscriber signal is associated with a unique location in said memory means.

6. The apparatus of claim 5 wherein said sensing means includes a plurality of line interface units each connected to a different group of said metering lines wherein said metering lines from each group are addressed one at a time by bits from said address counter.

7. The apparatus of claim 6 wherein said sensing means further includes four modules each formed from a group of line interface units and wherein output bits from said address counter operate to address said line interface units one at a time in each module and wherein each of the addressed line interface units is connected as an input to an analog-to-digital converter for forming digitally encoded representation of the multistate subscriber signals.

8. The apparatus of claim 7 further including subscan gates responsive to the low order bits of said address counter for selecting one of the outputs from said analog-to-digital converters one at a time for input to said memory means.

9. The apparatus of claim 1 wherein said memory means further includes control memory means for receiving inputs representative of the multistate signal of each subscriber unit and accumulator memory means for storing duration and zone information for each subscriber unit call.

10. The apparatus of claim 9 wherein said control memory means includes a shift register having one register stage for each subscriber signal.

11. The apparatus of claim 9 wherein said accumulator memory means includes a shift register for storing duration and zone information associated with each subscriber signal.

12. The apparatus of claim 9 further including output circuit means operative to select output data from said memory means for transmission to an external memory.

13. The apparatus of claim 12 wherein said apparatus includes means for addressing said memory means at a first frequency when said output circuit means is operative to select output data and at a second frequency when said memory means is receiving inputs representative of multistate subscriber signals.

14. The apparatus of claim 12 further including first and second selectable redundant data paths for transmission of data to said external memory.

15. A message metering apparatus for metering the usage of a plurality of subscriber units in a telephone system, the improvement comprising, circuit means for carrying multistate subscriber signals associated with each subscriber unit for indicating subscriber unit usage of the telephone system, a plurality of scanner banks connected to said circuit means wherein each scanner bank is addressable for sensing one of an associated group of multistate subscriber signals, a plurality of scanner bank adapters, each being associated with a corresponding scanner bank and each including control means for generating addresses to address the associated scanner bank and each including memory means having memory locations corresponding to each subscriber unit within the associated group, said memory means in each scanner bank adapter being concurrently addressed during the addressing of said control means for storing usage information derived from said multistate subscriber signal in the corresponding memory location.

16. The apparatus of claim 15 further including output and control unit means for periodically scanning said scanner bank adapters and for reading out usage information for each subscriber signal upon termination of a completed subscriber telephone call.

17. The apparatus of claim 15 wherein each of said control means includes an address counter for forming said addresses within the associated group in said scanner banks and includes means for stepping said address counter and for concurrently stepping the address of said member means whereby information from each subscriber signal is stored within an unique location in the memory means of the associated scanner bank adapter.

18. The apparatus of claim 15 further including output and control means for asynchronously scanning said scanner bank adapters independent of the addressing of said control means.

19. The apparatus of claim 18 wherein each of said scanner bank adapters includes output buffer means associated with each of the corresponding memory means and including data transfer means to transfer data to said output and control means asynchronously with respect to the storage of usage information in said memory means.

20. A message metering apparatus for metering the usage of a plurality of subscribers in a telephone system wherein subscriber units are organized in groups of 1,000 and wherein the higher-order four digits of seven-digit directory numbers are common, the improvement comprising, circuit means for carrying multistate subscriber signals associated with each subscriber unit for indicating subscriber unit usage of the telephone system, a plurality of scanner banks connected to said circuit means, each scanner bank addressable by eight binary bits for simultaneously sensing four at a time an associated group of 1,000 multistate subscriber signals, said scanner banks each including a plurality of line interface units each connected to 16 subscriber metering lines each selecting one line at a time under control of four of said binary bits for a total selection of 256 lines at a time, each including four analog gates responsive to four lines at a time of said 256 lines as selected by the remaining four of said address bits and each including four analgo-to-digital converters response to said four lines at a time for forming four at a time digitally encoded 2-bit signals of the associated multilevel subscriber signals, a plurality of scanner bank adapters, each being associated with a corresponding scanner bank, each including control means for generating 10-bit binary addresses to address the associated scanner bank, each including circulating shift register memory means having memory locations corresponding to each subscriber unit within the associated group of 1,000, said memory means in each scanner bank adapter being concurrently addressed during the addressing of each associated control means for storage using information derived from said digitally encoded signals, and each including receiver and subscan means responsive to two low-order address bits of said addresses for selecting one at a time the four digitally encoded 2-bit signals for analysis by and storage in said memory means.

* * * * *

PO-1050
(5/69)

UNITED STATES PATENT OFFICE
CERTIFICATE OF CORRECTION

Patent No. 3,818,456 Dated June 18, 1974

Inventor(s) JOHN C. McDONALD & DALTON W. MARTIN

It is certified that error appears in the above-identified patent and that said Letters Patent are hereby corrected as shown below:

IN THE CLAIMS:

Claim 1, column 16, line 12, between "addressing means" and "a multistate" please insert --for sensing--.

Claim 5, column 16, line 40, delete "the" and substitute therefor --said--.

Claim 17, column 17, line 57, delete "an" and substitute therefor --a--.

Claim 19, column 18, line 10, delete "including" and substitute therefor --includes--.

Claim 20, column 18, line 36, delete "analgo-" and substitute therefor --analog- --.

Signed and sealed this 8th day of October 1974.

(SEAL)
Attest:

McCOY M. GIBSON JR.
Attesting Officer

C. MARSHALL DANN
Commissioner of Patents